Nov. 12, 1940.   E. L. SHELTON   2,221,331
DIRECTION INDICATOR FOR AUTOMOBILES
Filed July 2, 1938
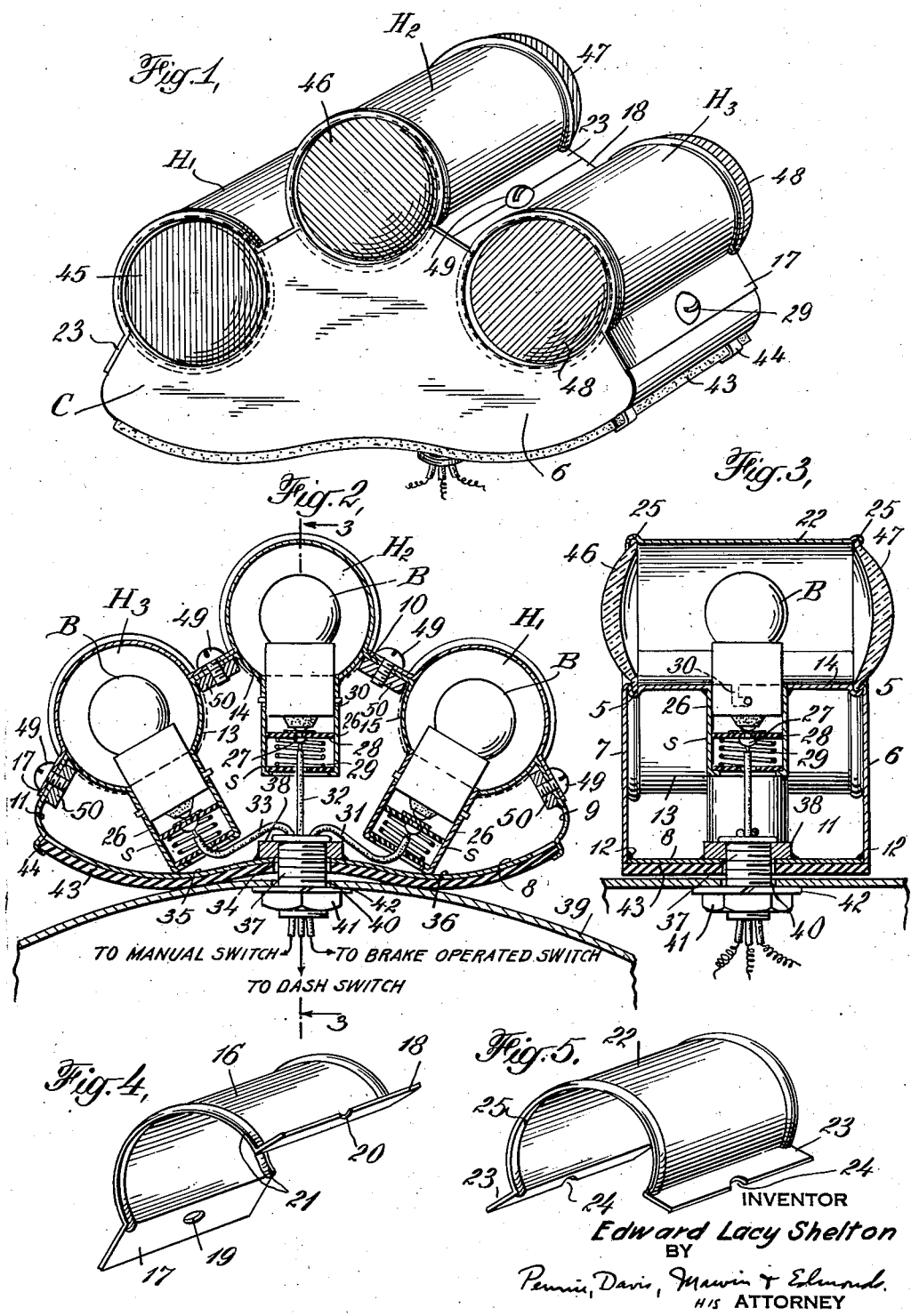
INVENTOR
Edward Lacy Shelton
BY
Pennie, Davis, Marvin & Edmonds
HIS ATTORNEY Patented Nov. 12, 1940

2,221,331

UNITED STATES PATENT OFFICE 2,221,331

DIRECTION INDICATOR FOR AUTOMOBILES

Edward Lacy Shelton, Memphis, Tenn.

Application July 2, 1938, Serial No. 217,234

3 Claims. (Cl. 177—329)

This invention relates to direction indicators for automobiles and like vehicles and more particularly concerns an improved indicator comprising a multiple signal light device.

In the operation of automobiles and other vehicles, it is necessary or desirable to provide means for indicating or signaling certain information such as intended stops or turns to other vehicles or pedestrians. Such signals may be conveniently given by displaying lights of various color or arrangement, and it is desirable that at least some of the signals be so displayed as to be visible from both the forward and the rearward end of the vehicle.

With the above and other considerations in mind, it is the purpose of the present invention to provide an improved direction indicator or light signal device for automobiles or other vehicles, which device is extremely compact, is of sturdy and durable construction and is composed of parts which may be constructed and assembled at a very low cost. Another object of the invention is to provide a light signal device so constructed and arranged as to be quickly and easily secured to a flat or crowned fender or other body surface of a vehicle. Further objects of the invention include the provision of a signal device including a plurality of lamp housings so constructed as to be conveniently accessible, individually or collectively, for the repair or replacement of the lamp bulbs or lenses thereof, and in which each of the several lamp housings are so designed and arranged as to simultaneously display an indication in two opposite directions, preferably forwardly and rearwardly of the vehicle.

Other objects, advantages and characteristic features of the invention will be apparent as the description thereof progresses.

In describing the invention in detail, reference will be made to the accompanying drawing in which a typical embodiment thereof has been illustrated. In the drawing—

Figure 1 is a front perspective view of the signal device embodying the invention;

Figure 2 is a sectional rear end elevation of the signal device of Figure 1;

Figure 3 is a sectional view taken along the line 3—3 of Figure 2 and viewed in the direction of the arrows; and Figures 4 and 5 are respectively perspective views of two different forms of removable lamp housing caps employed in the signal device illustrated in the preceding figures.

Referring to the drawing, the embodiment of the invention there illustrated comprises generally a casing C of somewhat triangular section and including three substantially cylindrical lamp housings $H_1$, $H_2$ and $H_3$ extending therethrough from the front end wall 6 to the rear end wall 7 thereof. The walls of the casing C may be formed in various ways, and as shown, the bottom wall 8, side walls 9 and 11 and top wall 10 are formed of a single continuous strip of sheet metal or other material joined at 12 by suitable means such as soldering, welding or brazing.

In accordance with one feature of the invention, the lamp housings are formed by providing spaced depressions in the top casing wall and covering these depressions with arched cap or cover means which cooperate with the depressions to form tubular lamp housings extending through the casing from the front to the rear end thereof. As best shown in Figures 2 and 3, the top casing wall 10 is provided with three transversely spaced substantially semi-cylindrical depressions 13, 14 and 15 connected by plane top wall portions. The depressions may be of any desired shape and relative disposition. As shown, each depression is of substantially semi-circular section and the three depressions are arranged radially or fanwise across the top of the casing. A bead forming an integral groove 5 is provided along each edge of each depression 13, 14 and 15 for the purpose of receiving and retaining the edge of a lens, as hereinafter described. The front and rear end walls 6 and 7 of the casing C are provided with arcuate upper edge recesses corresponding to the top wall depressions 13, 14 and 15, and the end walls 6 and 7 are suitably fixed to the top, bottom and side walls by soldering, brazing or welding, as shown in Figure 3.

Suitable substantially semi-cylindrical arched caps are provided for the lamp housings $H_1$, $H_2$ and $H_3$. As shown in Figures 2 and 4, the caps 16 for the outer lamp housings $H_1$ and $H_3$ are provided with integral ears or extensions 17 and 18, so disposed as to lie flush with the plane portions of the casing top wall 10 on the opposite sides of the depressions 13 and 15. The ears 17 are provided with holes 19 for receiving fastening means, and the ears 18 are provided with semi-circular edge notches 20 for the same purpose. A bead forming an integral lens retaining groove 21 is pressed or otherwise formed along each edge of the arched or cylindrical portions of the caps 16, as best shown in Figure 4. As shown in Figures 3 and 5, the cap 22 for the central lamp housing $H_2$ is similar in construction to the caps 16, being provided with fastening ears 23 having semi-circular edge notches 24. Lens retaining grooves 25 are provided at the opposite ends of the arched portion of the cap 22.

An incandescent lamp bulb B is disposed in a suitable socket S in each of the lamp housings H1, H2 and H3. The lamp sockets are preferably of conventional construction and as shown, may each comprise a cylindrical member 26 carrying a center contact 27 on an insulating disc 28 which is biased upwardly by a coil spring 29. The lamp bulb B is removably secured in each socket S by the usual bayonet joint 30. Lead wires 31, 32 and 33 are respectively connected to the center contacts 27 of the sockets S of the lamp housings H1, H2 and H3, and these wires are energized through suitable switches from a battery or other source of electrical energy, the return of the circuit being made through a ground comprising the metallic parts of the vehicle. The lamp sockets S are respectively fixed in circular openings at the bottom of each of the three depressions 13, 14 and 15 by suitable means such as a soldered joint.

In accordance with the invention, the bottom wall 8 of the casing C is so formed as to permit the rigid connection of the device to a crowned fender or other curved body part of an automobile by the use of a suitable clamping or connecting means. This is accomplished, as shown, by forming the bottom wall 8 to provide an upwardly recessed or re-entrant portion 34 with downwardly depressed portions 35 and 36 on either side thereof. A threaded nipple or equivalent connector 37 is inserted through an opening at the highest point of the re-entrant portion 34 and is secured to the bottom wall 8 by suitable means such as the nut 38 welded or soldered to the inner surface of the bottom wall about the opening.

The casing C is preferably mounted with the bottom wall 8 thereof bearing against and extending transversely with respect to the top, corner or side of a crowned fender 39 so that the lamp housings may be visible from both ends of the vehicle. The mounting is accomplished by boring a hole 40 through the fender, inserting the nipple 37 therethrough and drawing the nipple through the hole by means of a nut 41 and lock washer 42 engaging the under surface of the fender. With the arrangement described, the casing C may be securely fastened to fenders or other body surfaces which are flat or of various curvatures. The location of the connecting nipple 37 in the re-entrant portion of the bottom wall 8 provides spaced wall areas comprising the downwardly depressed portions 35 and 36 which firmly engage spaced points on the supporting surface, even if such surface comprises the top or side of a highly crowned fender.

The lead wires 31, 32 and 33 of the lamp bulbs B are conveniently disposed within the nipple 37 as shown. If desired, a gasket or pad 43 of rubber or other suitable compressible material may be disposed between the bottom casing wall 8 and the supporting surface 39. In the disclosed embodiment, the pad 43 is fastened to the casing wall 8 by ears 44 struck from this wall at the opposite ends of the pad 43.

Suitable lenses of colored or clear glass or equivalent light transmitting material are provided at the opposite ends of each lamp housing H1, H2 and H3. Any desired arrangement of lens colors may be used. As shown, the lamp housing H1 may comprise a stop signal light with red lenses 45 at each end thereof; the center lamp housing H2 may comprise a clearance and parking signal light with a green lens 46 at its front end and a red lens 47 at its rear end; and the lamp housing H3 may comprise a left turn signal light with amber lenses 48 at each end thereof. The various lenses are secured in the ends of the respective lamp housings by edge engagement with the grooves 5 in the housing depressions 13, 14 and 15, and the grooves 21 and 25 in the caps 16 and 22.

With the lens color arrangement described, the lead wire 31 for the bulb B of the stop signal lamp housing H1 may be energized through a brake operated switch, and the lead 33 for the bulb of the turning signal lamp housing H3 may be energized through a switch disposed for operation by the hand or foot of the driver. The clearance signal light may be used to indicate that the car is in operation or may serve as a parking light and the lead wire 32 for the bulb of the central lamp housing H2 may accordingly be energized through a dash switch. Circuit interrupters of known construction may be connected in the circuits for the stop and left turn signal lights whereby a flashing or blinker type of signal is displayed.

The caps 16 and 22 are preferably removably secured to the casing C by suitable means such as the screws 49. These screws pass through the openings 19 in the outer ears 17 of the outer caps 16 and through the openings formed by the aligned notches 20 and 24 in the inner ears 18 of the outer caps 16 and the ears 23 of the center cap 22. Nuts 50 may be secured to the inner surface of the top casing wall 10 at the plane portions thereof for the reception of the screws 49.

Although the signal device of the invention has been described in connection with a single embodiment thereof, it is to be understood that the invention is not limited to this illustrative construction but includes such modifications thereof as fall within the scope of the appended claims.

I claim:

1. A vehicle signal device comprising a casing having bottom and side walls and front and rear end walls, said end walls having aligned substantially semi-circular recesses in the upper edges thereof, a top wall for said casing having substantially semi-cylindrical depressions therein connecting the aligned semi-circular recesses of said end wall edges, substantially semi-cylindrical cap means secured over each of said top wall depressions and forming therewith cylindrical lamp housings extending from end to end of said casing, a lamp bulb within each of said cylindrical housings, means for supporting each of said lamp bulbs including a lamp socket secured to and projecting inwardly from said depression in said casing top wall and extending into the interior of said casing, lens means disposed between said substantially semi-cylindrical depressions and said cap means at each end of each of said lamp housings and means for holding said lens means in place.

2. A vehicle signal device comprising a casing having integral bottom and side walls and front and rear end walls secured thereto, said end walls having aligned substantially semi-circular recesses in their upper edges at points spaced transversely of the casing, a top wall fixed to said side and end walls and having a plurality of spaced substantially semi-cylindrical depressions therein connecting said aligned top edge recesses of said front and rear end walls, said depressions having transversely disposed grooves therein adjacent the opposite ends thereof, a lamp bulb within each of said depressions, means for supporting each of said lamp bulbs including a lamp socket secured to and projecting inwardly from said depression in said casing top wall and extending into the interior of said casing, a substantially semi-cylindrical cap secured to said top wall over each of said depressions and forming therewith a cylindrical lamp housing extending from end to end of said casing, each of said caps having a transverse bead forming a groove adjacent its front and rear edges, and lens means retained in the opposite ends of each of said lamp housings by engagement with said top wall depression and cap bead grooves.

3. A vehicle signal device comprising a casing having a top wall including a plurality of spaced substantially semi-cylindrical depressions connected by plane portions, substantially semi-cylindrical cap means extending over each of said depressions and cooperating therewith to form a tubular lamp housing, plane outwardly extending ears on said cap means engaging said plane portions of said casing top wall, means for removably securing said ears to said top wall, lamp means in each of said lamp housings including a lamp socket secured to and projecting inwardly from said casing top wall depression and into the interior of said casing, and lens means at the ends of said tubular lamp housings.

EDWARD LACY SHELTON.